_United States Patent Office_

2,801,151
Patented July 30, 1957

2,801,151

DIALKYLAMMONIUM DIALKYLCARBAMATES AS SELECTIVE SOLVENTS FOR CARBON DIOXIDE AND HYDROGEN SULFIDE

William T. Nelson, Bartlesville, Okla., assignor to Phillips Petroleum Company, a corporation of Delaware No Drawing. Application November 4, 1953, Serial No. 390,256

17 Claims. (Cl. 23—2)

This invention relates to separation of certain gases from gaseous mixtures with other gases by extraction with dialkylammonium dialkylcarbamates. In one aspect it relates to dialkylammonium dialkylcarbamates, in which the alkyl groups contain from 1 to 3 carbon atoms per alkyl group, as selective solvents for the extraction of $CO_2$ and $H_2S$ from mixtures with one or more of methane, ethylene, ethane and other higher molecular weight hydrocarbons, and such other gases, as carbon monoxide, nitrogen, hydrogen and the like. In another aspect it relates to dimethylammonium dimethylcarbamate as a new and novel selective solvent for the extraction of one or both of $CO_2$ and $H_2S$, from mixtures with one or more of carbon monoxide, methane, acetylene, ethylene, ethane and other higher molecular weight hydrocarbons and such other gases as nitrogen, oxygen, hydrogen and the like.

Many industrial gases contain impurities which must be removed before the gases are suitable for certain uses and many processes are known for the purification of these gases. The most widely used purification process for gaseous streams involves the absorption of certain constituents in a liquid absorption medium. Such a purification operation can be performed so that either the desired constituent is absorbed in the absorption medium and subsequently recovered therefrom or the impurities are absorbed in the absorption medium leaving the desired constituent in a relatively pure form. As an example of the first procedure, a liquid absorption medium, such as water, is employed in the scrubbing of carbon dioxide from flue gases as a preliminary step in the manufacture of liquid and solid carbon dioxide. The absorption step is performed at an elevated pressure and the carbon dioxide thereafter recovered from the water. By the second purification procedure, the carbon dioxide present in nitrogen- and hydrogen-rich streams for the manufacture of ammonia is removed by absorption in a liquid absorption medium, such as water or monoethanolamine, before the nitrogen and hydrogen gases are reacted under relatively high pressure in the presence of a catalyst for the synthesis of ammonia. Thus, the development of solvents of improved capacity and selectivity for the treatment of industrial gases is particularly desirable for the economical utilization of these gases.

An object of my invention is to provide an efficient process for the separation of certain gases from admixtures with other gases.

Still another object of my invention is to provide an easily operable and simple process for separation of $CO_2$ and $H_2S$ from their admixtures with other gases.

Yet another object of my invention is to provide a process for the extraction of $CO_2$ and/or $H_2S$ from their admixtures with other gases and their separation as separate products.

Still another object of my invention is to provide a process for the separation and recovery of $CO_2$ from a gaseous mixture containing $CO_2$ along with one or more of $H_2S$, $C_2H_2$, $C_2H_4$, $CH_4$, $O_2$, $H_2$, $N_2$, CO, other saturated or unsaturated hydrocarbon gases and vapors.

Yet another object of my invention is to provide a process for the separation and recovery of $H_2S$ from admixture with $CO_2$, CO, $C_2H_2$, $C_2H_4$, $CH_4$, $O_2$, $H_2$, $N_2$, other saturated or unsaturated hydrocarbon gases and vapors.

Still other objects and advantages of my invention will be realized upon reading the following disclosure which fully describes my invention.

In its broadest aspect my invention involves the discovery that the dialkylammonium dialkylcarbamates are especially effective absorbents for such gases as carbon dioxide and hydrogen sulfide. I find that the capacity of my absorbents for carbon dioxide is considerably higher than the capacities of many other absorbents of the art, such as trimethyl carbamate, for this gas. I also find that the selectivity of my absorbents for carbon dioxide over such gases as hydrogen sulfide, acetylene and ethylene is much greater than the selectivities of many other known absorbents for carbon dioxide over those gases. Thus my absorbents lend themselves to the separation and recovery of $CO_2$ from mixtures with many gases as a separate product. They also lend themselves to the separation and recovery of $H_2S$ from mixtures with many gases as a separate product. If desired, $CO_2$ and $H_2S$ are extracted and recovered as a mixed gas product. This gaseous mixture is then further separated into individual gases if desired. When acetylene is present in a gaseous mixture being treated with my absorbents it more or less accompanies the hydrogen sulfide due to relative similarities of solubilities in the absorbents. However, hydrogen sulfide and acetylene are separated by treating with my absorbents when using a sufficient number of contacting stages.

The absorption of carbon dioxide, hydrogen sulfide, acetylene and certain other gases in my absorbents is a reversible one and upon heating and/or reducing pressure on the absorbent the absorbed gases are recovered and the absorbents regenerated.

By the term acetylene as used throughout this specification and claims I include such substituted acetylenes as methyl acetylene as well as the compound $C_2H_2$.

The absorbents or extraction solvents as they are termed, of my invention are represented by the following generic structural formula

in which $R_1$, $R_2$, $R_3$ and $R_4$ are alkyl groups containing from 1 to 3 carbon atoms per alkyl group. The simplest and lowest molecular weight compound having the above generic formula is the tetramethyl derivative. This derivative is illustrated by the following formula

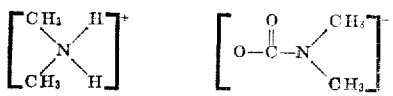

in which $R_1$, $R_2$, $R_3$ and $R_4$ of the generic formula are methyl groups. This tetramethyl compound has a molecular weight of 134.2, a boiling point of 60.2° C., a vapor pressure of 81 mm. at 25° C. and a specific gravity of 1.026 at 25° C.

The specific dialkylammonium dialkylcarbamates which are used for selectively absorbing carbon dioxide and/or hydrogen sulfide from other gases are enumerated, as follows: dimethylammonium dimethylcarbamate, diethylammonium diethylcarbamate, dipropylammonium dipropylcarbamate, diethylammonium dipropylcarbamate, dipropylammonium diethylcarbamate, dimethylammonium diethylcarbamate, diethylammonium dimethylcarbamate, dimethylammonium dipropylcarbamate, dipropylammonium dimethylcarbamate, methylethylammonium dimethylcarbamate, methylpropylammonium dimethylcarbamate, methylethylammonium diethylcarbamate, ethylpropylammonium diethylcarbamate, methylpropylammonium diethylcarbamate, methylethylammonium dipropylcarbamate, ethylpropylammonium dipropylcarbamate, methylpropylammonium dipropylcarbamate, dimethylammonium methylethylcarbamate, dimethylammonium ethylpropylcarbamate, dimethylammonium methylpropylcarbamate, diethylammonium methylethylcarbamate, diethylammonium ethylpropylcarbamate, diethylammonium methylpropylcarbamate, dipropylammonium methylethylcarbamate, dipropylammonium ethylpropylcarbamate, dipropylammonium methylpropylcarbamate, methylethylammonium methylethylcarbamate, methylethylammonium ethylpropylcarbamate, methylethylammonium methylpropylcarbamate, methylpropylammonium methylethylcarbamate, methylpropylammonium ethylpropylcarbamate, methylpropylammonium methylpropylcarbamate, ethylpropylammonium ethylpropylcarbamate, ethylpropylammonium dimethylcarbamate, ethylpropylammonium methylpropylcarbamate, and ethylpropylammonium methylethylcarbamate, dimethylammonium diisopropylcarbamate, diethylammonium diisopropylcarbamate, dipropylammonium diisopropylcarbamate, diisopropylammonium diisopropylcarbamate, methylethylammonium diisopropylcarbamate, methylpropylammonium diisopropylcarbamate, methylisopropylammonium diisopropylcarbamate, ethylpropylammonium diisopropylcarbamate, ethylisopropylammonium diisopropylcarbamate, propylisopropylammonium diisopropylcarbamate, dimethylammonium propylisopropylcarbamate, diethylammonium propylisopropylcarbamate, dipropylammonium propylisopropylcarbamate, diisopropylammonium propylisopropylcarbamate, methylethylammonium propylisopropylcarbamate, methylpropylammonium propylisopropylcarbamate, methylisopropylammonium propylisopropylcarbamate, ethylpropylammonium propylisopropylcarbamate, ethylisopropylammonium propylisopropylcarbamate, propylisopropylammonium propylisopropylcarbamate, dimethylammonium methylisopropylcarbamate, diethylammonium methylisopropylcarbamate, dipropylammonium methylisopropylcarbamate, diisopropylammonium methylisopropylcarbamate, methylethylammonium methylisopropylcarbamate, methylpropylammonium methylisopropylcarbamate, methylisopropylammonium methylisopropylcarbamate, ethylpropylammonium methylisopropylcarbamate, ethylisopropylammonium methylisopropylcarbamate, propylisopropylammonium methylisopropylcarbamate, dimethylammonium ethylisopropylcarbamate, diethylammonium ethylisopropylcarbamate, dipropylammonium ethylisopropylcarbamate, diisopropylammonium ethylisopropylcarbamate, methylethylammonium ethylisopropylcarbamate, methylpropylammonium ethylisopropylcarbamate, methylisopropylammonium ethylisopropylcarbamate, ethylpropylammonium ethylisopropylcarbamate, ethylisopropylammonium ethylisopropylcarbamate, propylisopropylammonium ethylisopropylcarbamate, diisopropylammonium dimethylcarbamate, diisopropylammonium diethylcarbamate, diisopropylammonium dipropylcarbamate, diisopropylammonium methylethylcarbamate, diisopropylammonium ethylpropylcarbamate, diisopropylammonium methylpropylcarbamate, propylisopropylammonium dimethylcarbamate, propylisopropylammonium diethylcarbamate, propylisopropylammonium dipropylcarbamate, propylisopropylammonium methylethylcarbamate, propylisopropylammonium ethylpropylcarbamate, propylisopropylammonium methylpropylcarbamate, methylisopropylammonium dimethylcarbamate, methylisopropylammonium diethylcarbamate, methylisopropylammonium dipropylcarbamate, methylisopropylammonium methylethylcarbamate, methylisopropylammonium ethylpropylcarbamate, methylisopropylammonium methylpropylcarbamate, ethylisopropylammonium methylpropylcarbamate, ethylisopropylammonium dimethylcarbamate, ethylisopropylammonium diethylcarbamate, ethylisopropylammonium dipropylcarbamate, ethylisopropylammonium methylethylcarbamate, ethylisopropylammonium ethylpropylcarbamate, ethylisopropylammonium methylpropylcarbamate. Mixtures of two or more of these materials can also be used.

Of the hereinbefore enumerated dialkylammonium dialkylcarbamates, those which are preferred for use as solvents or extractants according to my invention are dimethylammonium dimethylcarbamate, diethylammonium diethylcarbamate, dimethylammonium diethylcarbamate, diethylammonium dimethylcarbamate, methylethylammonium dimethylcarbamate, methylethylammonium diethylcarbamate, dimethylammonium methylethylcarbamate, diethylammonium methylethylcarbamate, and methylethylammonium methylethylcarbamate. This preferred group of absorbents is defined as the dialkylammonium dialkylcarbamates in which the alkyl groups are methyl and ethyl or in which the alkyl groups contain 1 and 2 carbon atoms per alkyl group.

The above enumerated carbamates are used as individuals or as mixtures of two or more as the absorption medium. The listed carbamates which are liquid at a desired absorption or extraction temperature are used as absorbents in the liquid state, or, if desired, they are diluted with water and the aqueous solutions used as the solvents. Technical grades as well as the pure compounds can be used. For large scale operations the absorbents of my invention used are usually of the commercial or technical grade. The listed carbamates which are solids at atmospheric temperatures or at a desired absorption temperature are dissolved in water and the resulting aqueous solutions, preferably concentrated, used as the absorbents. By concentrated solutions, I mean aqueous solutions of 85% to 90% of saturation. An aqueous solution of two or more of the above specified carbamates are used under certain conditions to absorb $CO_2$ and/or $H_2S$.

In solvent extraction operations employing as an example, dimethylammonium dimethylcarbamate, the gaseous stream containing carbon dioxide and hydrogen sulfide (and acetylene, if present) is contacted with the solvent or absorption liquid. This contacting operation is carried out in a suitable absorption vessel such as a packed tower, spray tower or a bubble plate column. The gaseous stream is usually introduced into the contacting vessel at a point near its bottom so that it can have a considerable time in contact with the down-flowing absorbent which obviously is introduced into the upper portion of the vessel.

The absorbent need not be the pure or even commercially pure compound. It is mixed with other suitable and miscible solvents or absorbents, or with liquid materials which have no selective solvent action or substantially none for the gases to be absorbed, such as water, disclosed above. The temperature and pressures employed can vary over wide limits but ordinarily atmospheric or substantially atmospheric temperatures at near or superatmospheric pressure are used.

It is preferred to operate the absorption step of my operation at a temperature well below the boiling point of the solvent and above the dew-point of the gaseous mixture being treated at the existing pressure. At very low temperatures, for a fixed pressure, the absorptive capacity of my solvents for $CO_2$ and $H_2S$ is very greatly increased, but the solubility may be so great that less selectivity is obtained whereas at very high temperatures so little of these gases may be dissolved that selectivity is of little consequence. As in ordinary absorption operations the use of superatmospheric pressures increases the capacity of the solvent for these gases but higher pressures obviously require more expensive equipment.

The gases selectively absorbed in my solvents along with very small quantities of other gases are recovered by heating the solution, by reducing the pressure thereon, or by increasing the temperature and reducing the pressure simultaneously. Steam or other suitable stripping is also used. After removal of the absorbed gases from the solvent, as by stripping, the solvent is cooled, preferably by heat exchange with cool rich absorbent and possibly further cooled by additional heat exchange, and it is then recirculated to the absorption vessel.

As an example of the utility of the aforementioned absorbents of my invention for selectively absorbing carbon dioxide and hydrogen sulfide from gas mixtures are the following solubility data:

TABLE I

*Solubilities of gases in solvents at one atmosphere partial pressure of gas at 25° C.*

| Solvent | $\alpha CO_2$ | $\alpha H_2S$ | $\alpha C_2H_2$ | $\alpha C_2H_4$ | $\alpha C_2H_6$ |
|---|---|---|---|---|---|
| Dimethylammonium-dimethylcarbamate | 27.0 | 18.6 | 16.2 | 1.00 | .74 |
| Trimethylcarbamate | 4.25 | | 15.4 | 2.63 | |

Saturated aliphatic hydrocarbons which might be present in a gaseous product containing $CO_2$ and/or $H_2S$ and such gases as $N_2$, $O_2$, and $H_2$ are only slightly soluble in my absorbents as exemplified by the very low solubility of ethane in dimethylammonium dimethylcarbamate. These solubilities are expressed in terms of the Bunsen coefficient, i. e., alpha ($\alpha$), which is the milliliters of solute gas, at 760 millimeters of (Hg) pressure and 0° C., dissolved per milliliter of solvent at one atmosphere partial pressure of solute gas. The dimethylammonium dimethylcarbamate was obtained commercially and the trimethylcarbamate was synthesized from methyl chloroformate and dimethylamine. This synthesized trimethylcarbamate had a boiling point of 130.4° C. at 749 mm. of pressure and density (15°/4°) of 1.0115 in comparison to the literature values of boiling point of 131° C. at 760 mm. pressure and density (15°/4°) of 1.012.

The selectivities (ratio of solubilities) of dimethylammonium dimethylcarbamate for carbon dioxide over acetylene, for carbon dioxide over hydrogen sulfide, and for carbon dioxide over ethylene are given in Table II and compared to the selectivities of trimethylcarbamate for the same constituents, excepting for carbon dioxide over hydrogen sulfide.

TABLE II

*Selectivities of solvents at one atmosphere partial pressure of gas and 25° C.*

| Solvent | $\alpha CO_2/\alpha C_2H_4$ | $\alpha CO_2/\alpha C_2H_2$ | $\alpha CO_2/\alpha H_2S$ |
|---|---|---|---|
| Dimethylammonium-dimethylcarbamate | 27.0 | 1.67 | 1.45 |
| Trimethylcarbamate | 1.6 | 0.28 | |

In one operation a feed stock containing $CO_2$ and $H_2S$ along with one or more of such other gases as $CH_4$, $C_2H_4$, $C_2H_6$, $N_2$, $H_2$, etc., is according to one method of treatment, contacted with a sufficient quantity of one or a mixture, or an aqueous solution of one or more of my absorbents, to dissolve or absorb the $CO_2$ and $H_2S$. The enriched absorbent is then treated in a stripping operation to separate the dissolved gases. In an alternative operation, the absorbed gases are flashed from the absorbent by increase of temperature, pressure reduction or both. In this latter operation the absorbed gases are removed according to their partial pressures in the solvent. The removed absorption liquid is then cooled and returned to the absorption operation. If these two gases are to be recovered separately they are further treated in a subsequent selective absorption operation to separate the $CO_2$ from the $H_2S$. In case acetylene is present it, in general, accompanies the hydrogen sulfide. In case a gas being treated for recovery of $CO_2$ is free from $H_2S$, the operation is simple. When such a gas being treated contains $C_2H_2$, the $CO_2$ is easily separated from this hydrocarbon. In case a gas to be treated contains $H_2S$, and is free from $CO_2$, this operation is also very simple. Any $C_2H_2$ present, as mentioned hereinbefore, accompanies the $H_2S$ and is separated therefrom in a subsequent operation, if desired.

It is obvious that the minimum temperature of contacting a feed stock containing $CO_2$ and/or $H_2S$ with my absorbents will be determined by the freezing point of the absorbent in case a pure compound is used, or of the solution in case a mixture of my carbamates, or a diluent or solvent is used with the carbamate, since contacting temperatures must always be above the temperature at which the absorbent liquid solidifies. Likewise, the maximum temperature of absorption will be limited to the boiling point of the solvent under the pressure existing in the absorption apparatus. Ordinarily absorption temperatures are substantially below the boiling point of the solvent because of increased capacity of the solvent for gases at the lower temperatures.

The pressure carried upon the absorption column is ordinarily selected somewhat above atmospheric pressure. A minimum pressure might be that required to give material flow in equipment subsequent to the absorber. That is, sufficient pressure can be carried in the absorber to force the enriched absorbent from the absorber through heat exchange equipment into a stripping vessel without need for use of additional pumping equipment. A pump however will be needed for pumping absorbent from the stripping vessel into the absorber. As is well known in the absorption art higher pressures increase the absorptive capacity of absorbents the upper limit being limited by several working pressures of the absorption vessel or by the cost thereof. Closed coil heating can be employed in the stripping zone, or, if desired, open steam can be used.

Carbon dioxide is separated from an admixture comprising carbon dioxide and ethylene and/or ethane by contacting said admixture with dimethylammonium dimethylcarbamate, separating the residual unabsorbed gas from the carbamate and recovering carbon dioxide from the separated carbamate.

Hydrogen sulfide is separated from an admixture comprising hydrogen sulfide and ethylene and/or acetylene by contacting said admixture with dimethylammonium dimethylcarbamate, separating the residual unabsorbed gas from the carbamate and recovering hydrogen sulfide from the separated carbamate.

Carbon dioxide is separated from an admixture comprising carbon dioxide and hydrogen sulfide by contacting said admixture with dimethylammonium dimethylcarbamate, separating the residual unabsorbed gas from the carbamate and recovering the carbon dioxide from the separated carbamate.

While certain embodiments of the invention have been described for illustrative purposes the invention obviously is not limited thereto.

I claim:

1. A method for selectively removing carbon dioxide from an admixture of carbon dioxide in a separable concentration with at least one other gas selected from the group consisting of hydrogen sulfide, methane, ethane, acetylene, ethylene, carbon monoxide, hydrogen, nitrogen and oxygen comprising contacting said admixture with a dialkylammonium dialkylcarbamate in the liquid state and having the following structual formula

in which $R_1$, $R_2$, $R_3$ and $R_4$ are alkyl groups having from 1 to 3 carbon atoms per alkyl group.

2. A process for separating carbon dioxide from an admixture with acetylene comprising contacting the admixture with dimethylammonium dimethylcarbamate in the liquid state and separating the unabsorbed gas from the carbamate containing absorbed gas.

3. A process for separating carbon dioxide from an admixture with ethylene comprising contacting the admixture with dimethylammonium dimethylcarbamate in the liquid state and separating the unabsorbed gas from the carbamate containing absorbed gas.

4. A process for the selective removal of carbon dioxide from an admixture of carbon dioxide in a separable concentration with acetylene comprising contacting the admixture with an aqueous solution of dimethylammonium dimethylcarbamate and separating the unabsorbed gas from the carbamate containing absorbed gas.

5. A process for the selective removal of carbon dioxide from an admixture of carbon dioxide in a separable concentration with ethylene comprising contacting the admixture with an aqueous solution of dimethylammonium dimethylcarbamate and separating the unabsorbed gas from the carbamate containing absorbed gas.

6. A method for separating carbon dioxide from an admixture of carbon dioxide in a separable concentration with hydrogen sulfide comprising contacting said mixture with dimethylammonium dimethylcarbamate in the liquid state and separating the carbamate containing the absorbed gas from the unabsorbed gas.

7. A method for separating carbon dioxide from an admixture of carbon dioxide in a separable concentration with hydrogen sulfide comprising contacting said mixture with an aqueous solution of dimethylammonium dimethylcarbamate and separating the aqueous carbamate containing dissolved gas from the undissolved gas.

8. A method for separating carbon dioxide from an admixture of carbon dioxide in a separable concentration with ethane comprising contacting said mixture with dimethylammonium dimethylcarbamate in the liquid state and separating the carbamate containing dissolved gas from the undissolved gas.

9. A method for separating carbon dioxide from a mixture of carbon dioxide in a separable concentration with at least one other gas selected from the group of gases consisting of hydrogen sulfide, methane, acetylene, ethylene, ethane, carbon monoxide, hydrogen, nitrogen and oxygen comprising contacting a mixture of said gases with a dialkylammonium dialkylcarbamate in the liquid state and having the following structural formula

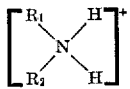 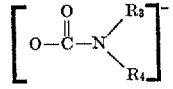

in which $R_1$, $R_2$, $R_3$ and $R_4$ are alkyl groups having from 1 to 3 carbon atoms per alkyl group, removing the undissolved gas from the residual carbamate containing dissolved carbon dioxide and recovering carbon dioxide from the residual carbamate.

10. A method for separating carbon dioxide from a mixture of carbon dioxide in a separable concentration with at least one other gas selected from the group of gases consisting of hydrogen sulfide, methane, acetylene, ethylene, ethane, carbon monoxide, hydrogen, nitrogen and oxygen comprising contacting said mixture of gases with an aqueous solution of a dialkylammonium dialkylcarbamate having the following structural formula

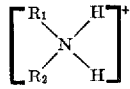 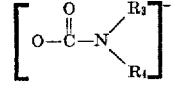

in which $R_1$, $R_2$, $R_3$ and $R_4$ are alkyl groups having from 1 to 3 carbon atoms per alkyl group.

11. A method for separating carbon dioxide from a mixture of carbon dioxide in a separable concentration with at least one other gas selected from the group of gases consisting of hydrogen sulfide, methane, ethane, acetylene, ethylene, carbon monoxide, hydrogen, nitrogen and oxygen comprising contacting a mixture of said gases with dimethylammonium dimethylcarbamate in the liquid state and separating contacted gas from residual carbamate.

12. A method for separating carbon dioxide from a mixture of carbon dioxide in a separable concentration with at least one other gas selected from the group of gases consisting of hydrogen sulfide, methane, ethane, acetylene, ethylene, carbon monoxide, hydrogen, nitrogen and oxygen comprising contacting a mixture of said gases with dimethylammonium diethylcarbamate in the liquid state and separating contacted gas from residual carbamate.

13. A method for separating carbon dioxide from a mixture of carbon dioxide in a separable concentration with at least one other gas selected from the group of gases consisting of hydrogen sulfide, methane, ethane, acetylene, ethylene, carbon monoxide, hydrogen, nitrogen and oxygen comprising contacting a mixture of said gases with diethylammonium dimethylcarbamate in the liquid state and separating contacted gas from residual carbamate.

14. A method for separating carbon dioxide from a mixture of carbon dioxide in a separable concentration with at least one other gas selected from the group of gases consisting of hydrogen sulfide, methane, ethane, acetylene, ethylene, carbon monoxide, hydrogen, nitrogen and oxygen comprising contacting a mixture of said gases with dimethylammonium methylethylcarbamate in the liquid state and separating contacted gas from residual carbamate.

15. A method for separating carbon dioxide from a mixture of carbon dioxide in a separable concentration with at least one other gas selected from the group of gases consisting of hydrogen sulfide, methane, ethane, acetylene, ethylene, carbon monoxide, hydrogen, nitrogen and oxygen comprising contacting a mixture of said gases with diethylammonium diethylcarbamate in the liquid state and separating contacted gas from residual carbamate.

16. A method for separating carbon dioxide from a mixture of carbon dioxide in a separable concentration with carbon monoxide comprising contacting said mixture with dimethylammonium dimethylcarbamate in the liquid state and separating the carbamate containing dissolved gas from the undissolved gas.

17. A method for separating carbon dioxide from a mixture of carbon dioxide in a separable concentration with at least one other gas selected from the group of gases consisting of hydrogen sulfide, methane, acetylene, ethylene, ethane, carbon monoxide, hydrogen, nitrogen and oxygen comprising contacting said mixture of gases with an aqueous solution of a dialkylammonium dialkylcarbamate having the following structural formula

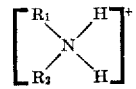 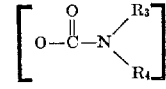

in which $R_1$, $R_2$, $R_3$ and $R_4$ are alkyl groups having from 1 to 3 carbon atoms per alkyl group, and separating the gas unabsorbed by said carbamate from the carbamate containing absorbed gas.

References Cited in the file of this patent

UNITED STATES PATENTS

| 2,251,216 | Woodhouse | July 29, 1941 |
| 2,594,044 | Loder | Apr. 22, 1952 |
| 2,634,825 | Drake | Apr. 14, 1953 |

FOREIGN PATENTS

| 450,519 | Great Britain | July 20, 1936 |
| 457,343 | Great Britain | Nov. 26, 1936 |

UNITED STATES PATENT OFFICE
CERTIFICATE OF CORRECTION

Patent No. 2,801,151                      July 30, 1957

William T. Nelson

It is hereby certified that error appears in the printed specification of the above numbered patent requiring correction and that the said Letters Patent should read as corrected below.

Column 2, lines 1 and 5, after "$C_2H_4$,", each occurrence, insert -- $C_2H_6$, --; column 7, line 2, claim 2, and line 7, claim 3, after "admixture", each occurrence, insert -- of carbon dioxide in a separable concentration --.

Signed and sealed this 23rd day of February 1960.

(SEAL)
Attest:

KARL H. AXLINE
Attesting Officer

ROBERT C. WATSON
Commissioner of Patents